(12) United States Patent
Tolfsen (10) Patent No.: US 6,260,920 B1
(45) Date of Patent: Jul. 17, 2001

(54) DEVICE FOR RELEASABLE ATTACHMENTS OF OBJECTS TO A MOBILE UNIT

(75) Inventor: Ulf Tolfsen, Gamle Fredrikstad (NO)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/308,899

(22) PCT Filed: Nov. 26, 1997

(86) PCT No.: PCT/SE97/01984

§ 371 Date: Aug. 20, 1999

§ 102(e) Date: Aug. 20, 1999

(87) PCT Pub. No.: WO98/23462

PCT Pub. Date: Jun. 4, 1998

(30) Foreign Application Priority Data

Nov. 26, 1996 (SE) .................................................. 9604353

(51) Int. Cl.[7] .................................................. A47D 1/10
(52) U.S. Cl. ................................ 297/256.16; 297/256.12; 297/253
(58) Field of Search ........................... 297/256.16, 256.1, 297/256.12, 253; 248/349.1

(56) References Cited

U.S. PATENT DOCUMENTS

| 4,762,364 | 8/1988 | Young | 297/256.12 |
|---|---|---|---|
| 4,936,629 | 6/1990 | Young | 297/256.12 |
| 4,971,392 | * 11/1990 | Young | 297/256.12 |
| 5,183,312 | 2/1993 | Nania | 297/256.12 |
| 5,441,329 | * 8/1995 | Janisch | 297/256.12 X |
| 5,466,044 | * 11/1995 | Barley et al. | 297/253 X |
| 5,487,588 | * 1/1996 | Burleigh et al. | 297/253 |
| 5,524,965 | * 6/1996 | Barley | 297/256.16 |
| 5,660,430 | * 8/1997 | Clarke | 297/256.12 X |
| 5,762,398 | * 6/1998 | Gonzalez et al. | 297/256.12 X |
| 5,935,010 | * 8/1999 | Clarke | 297/256.12 X |

FOREIGN PATENT DOCUMENTS

| 4137599 A1 | * 5/1993 | (DE) | 297/256.16 |
|---|---|---|---|
| 2 680 734 | 3/1993 | (FR) . | |
| 2 288 328 | 10/1995 | (GB) . | |

* cited by examiner

Primary Examiner—Peter M. Cuomo
Assistant Examiner—Rodney B. White
(74) Attorney, Agent, or Firm—Kilpatrick Stockton LLP (57) ABSTRACT

Apparatus for the releasable attachment of objects such as a child's seat to a motor vehicle is disclosed. The apparatus includes a first disk adapted to be fixed to the vehicle and a second disk adapted to be fixed to the child's seat, the disks adapted to be coupled together and centered about a common axis of symmetry. The first disk includes a plurality of locking pins and the second disk includes a corresponding plurality of locking apertures such that the disks can be adjusted between a first relative position in which the locking pins and apertures are disengaged and a second relative position in which the locking pins and apertures are engaged, and an axial slidable core for adjusting the locking pins and apertures between these first and second relative positions.

13 Claims, 5 Drawing Sheets

DEVICE FOR RELEASABLE ATTACHMENTS OF OBJECTS TO A MOBILE UNIT

FIELD OF THE INVENTION

The present invention relates to an arrangement for releasable attachment of an object to a mobile unit.

BACKGROUND OF THE INVENTION

Several different applications exist for which there is a need for means for a simple and safe attachment of a movable object, such as a child's seat to a vehicle, such as a car, a bicycle, a child's cart, and the like. The conventional method for attachment of a child's seat to a vehicle is to use a variety of straps which are fastened to a vehicle seat, or to utilize specially arranged loops in the seat itself or in a foot board. One problem with these methods has been that the safety level has varied to a great extent, and that, in any event, no rigidly fixed attachment has been obtained, which has resulted in a risk of the child seat turning over in the event of an accident. Another problem has been that the fixing points have varied from one vehicle to another which has given rise to compromise solutions by the child seat manufacturers.

A standardized solution has been suggested, which has involved a rigid fixture having four fixing points, and which thus results in a safe attachment. Up to now, this standard solution has required a corresponding engagement apparatus in a child seat having four attachment points. In this regard, there is a risk that it might be difficult to accomplish a safe connection at all four of these points in a single movement. Another standardized solution has been suggested, which has involved two fixing points, which therefore requires in some cases additional points of support such as in the form of adjustable upright members.

From British Patent No. 2,288,328, for example, there is shown a releasable attachment device which requires both a linear and a rotary motion in order to obtain a locking position. Furthermore, the previously known mechanism requires a comparatively large height, thereby resulting in a disadvantageously high location of a child's seat, for example.

SUMMARY OF THE INVENTION

An object of the present invention is to provide an attachment device which is easy to use and which has a high degree of reliability, by means of which, for example, it is impossible to obtain insufficient attachment.

In accordance with the present invention, this and other objects have been realized by the invention of apparatus for the releasable attachment of an object to a movable unit, the apparatus including a first engagement member having a first guiding support surface adapted to be fixed to the movable unit and a second engagement member having a second guiding support surface adapted to cooperate with the first guiding support surface and to be fixed to the object, whereby when engaged with each other the first and second engagement members are adapted to be centered about a common axis of symmetry, one of the first and second guiding support surfaces comprising the outer surface of one of the first and second engagement members and the other of the first and second guiding support surfaces comprising the inner surface of the other of the first and second engagement members, the first engagement member including a plurality of first locking members and the second engagement member including a plurality of second locking members for cooperating with the plurality of first locking members, whereby the first and second engagement members can be adjusted between a first relative position in which the plurality of first locking members and the plurality of second locking members are disengaged, and a second relative position in which the plurality of first locking members and the plurality of second locking members are lockingly engaged, a first adjustment member affixed to one of the first and second engagement members and a second adjustment member affixed to the other of the first and second engagement members for adjusting the plurality of first locking members and the plurality of second locking members between the first and second relative positions. Preferably the one of the first and second guiding support surfaces defines a dome-shaped surface and the other of the first and second guiding support surfaces defines a cup-shaped surface.

In accordance with one embodiment of the apparatus of the present invention, the one of the first and second guiding support surfaces comprises a first surface provided at an angle with respect to the axis of symmetry and a second surface provided substantially parallel to the axis of symmetry. Preferably, the the first surface has the shape of a conical jacket, and the second surface has the shape of a cylindrical jacket.

In accordance with another embodiment of the apparatus of the present invention, the plurality of first locking members comprises a plurality of locking pins substantially radially projecting with respect to the axis of symmetry for engagement with the plurality of second locking members when the first and second engagement members are in the second relative position. Preferably, the plurality of second locking members comprises a plurality of recesses corresponding to the plurality of locking pins.

In accordance with another embodiment of the apparatus of the present invention, the first adjustment member comprises an axially movable member movable between an initial position and a depressed position, whereby the axially movable member can be in the depressed position when the first and second engagement members are in the first relative position and in the initial position when the first and second engagement members are in the second relative position. In a preferred embodiment, the first adjustment member is associated with the first engagement member and the second adjustment member is associated with the second engagement member, the first engagement member including apertures means and the second engagement member including corresponding projection means, whereby when the first and second engagement members are engaged with each other and the projection means are not engaged in the aperture means, the projection means urges the axially movable member into the depressed position, and when the projection means are engaged in the aperture means the axially movable member is in the initial position.

In accordance with a preferred embodiment of the apparatus of the present invention, the plurality of first locking members are connected to the axially movable member whereby when the plurality of first locking members are disengaged from the plurality of second locking members the axially movable member is in the depressed position, and when the plurality of first locking members are engaged with the plurality of second locking members the axially movable member is in the initial position.

In accordance with another embodiment of the apparatus of the present invention, the second adjustment member includes a control handle, the control handle being engageable with the axially movable member whereby when the control handle is actuated to depress the axially movable member the plurality of first locking members is disengaged from the plurality of second locking members.

In accordance with a preferred embodiment of the apparatus of the present invention, the apparatus provides for the releasable attachment of a child's seat to a motor vehicle, the child's seat being the object and the automobile being the movable unit. In a preferred embodiment, the other of the first and second engagement members includes a guiding groove along the inner surface, the guiding groove adapted for guiding the plurality of first locking members therealong whereby the first and second engagement members may be coupled together and rotated with respect to each other.

The objects of the present invention are obtained by means of an apparatus for releasable attachment, the apparatus including a pair of engagement members in which both engagement members include cooperative guiding surfaces and support surfaces for centering the two engagement members around a joint symmetry axis, the guiding surfaces and support surfaces on the one hand being in the form of external surfaces on one of the engagement members, which form a dome-shaped figure, and on the other hand being in the form of internal surfaces on the other engagement member, which forms a cup-shaped figure, or vice versa, and the adjustment members being adapted for keeping the locking members in a disengagement position during a first engagement position and for keeping the locking members in a locking position during a final engagement position, while the two engagement members are coupled together and the interior surfaces are in close contact with, and are centered around, the exterior surfaces.

BRIEF DESCRIPTION OF THE DRAWINGS

The present invention will be further described in the following detailed description, with reference to the annexed drawings, in which.

DETAILED DESCRIPTION

Figure 1:
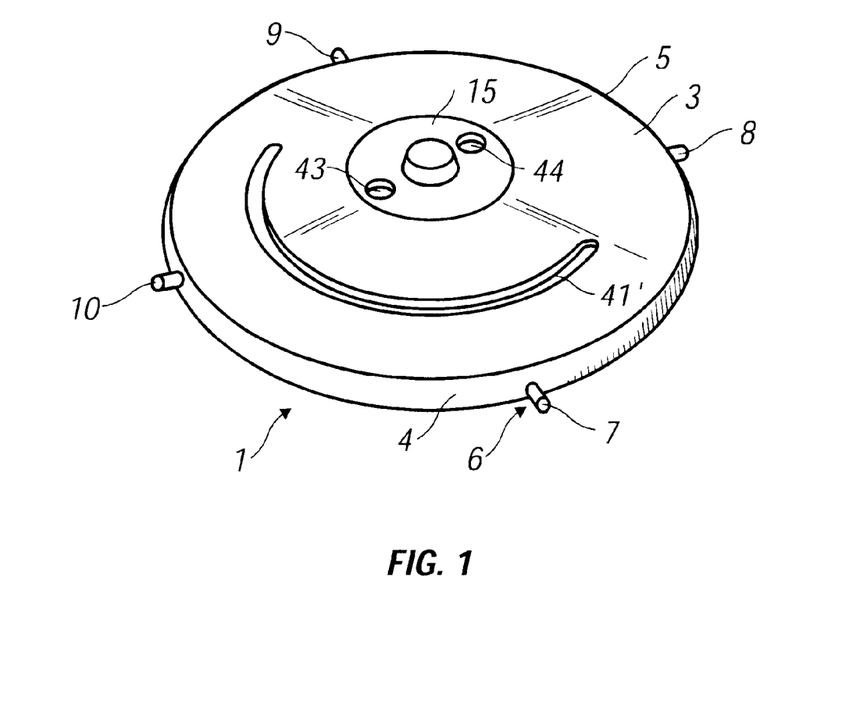
FIG. 1 is a top perspective view of a first engagement member forming part of the apparatus of the present invention.
Figure 2:
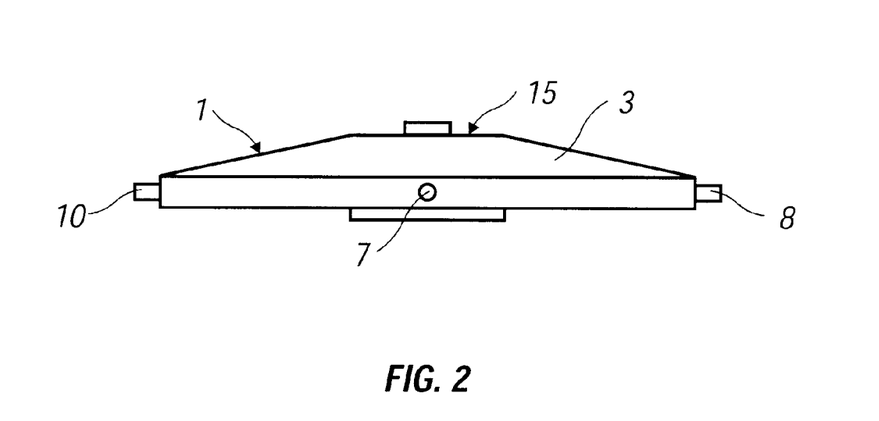
FIG. 2 is a side, elevational view of the first engagement member shown in FIG. 1.
Figure 3:
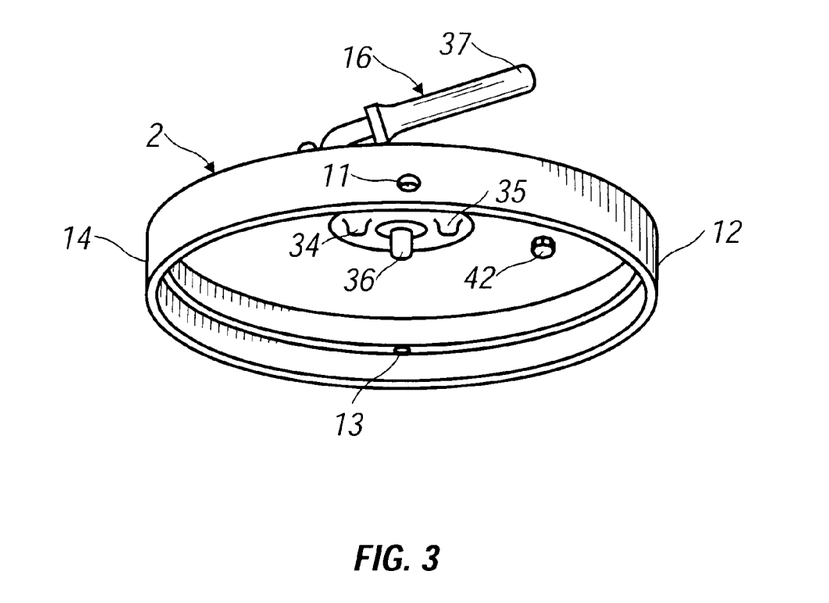
FIG. 3 is a bottom, perspective view of a second engagement member forming part of the apparatus of the present invention.
Figure 4:
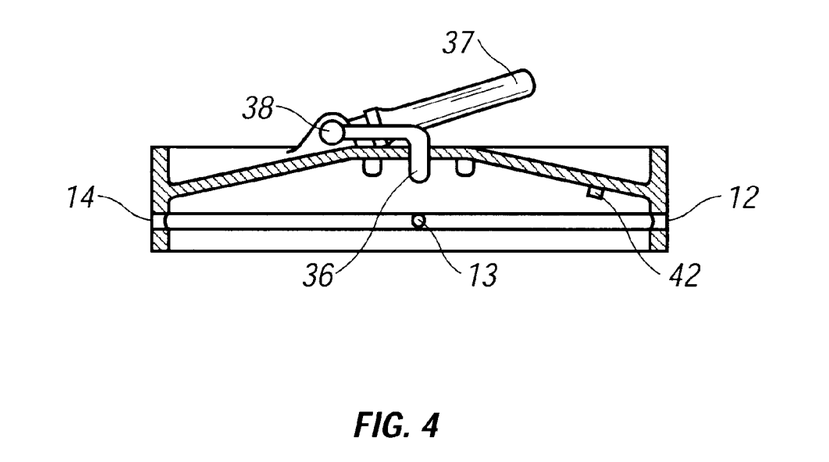
FIG. 4 is a side, elevational, cross-sectional view of the second engagement member shown in FIG. 3.

The attachment apparatus according to the present invention consists of two basic members, the principal construction of which is apparent from FIGS. 1–4. The first basic member, which is shown in FIGS. 1 and 2, is a first engagement member 1, which is intended to be anchored to a mobile unit, for example, a vehicle seat. The second basic member, which is shown in FIGS. 3 and 4, is a second engagement member 2, which is intended to be mounted to the underside of an object which is adapted for releasable attachment and fastening to the mobile unit. The first engagement member 1 presents guiding surfaces and support surfaces, 3 and 4, which are intended to cooperate with corresponding surfaces in the second engagement member 2 such that the second engagement member can be supported by, as well as attached to, the first engagement member in a rigid and reliable manner. In the example shown in FIGS. 1 and 4, the first engagement member is designed as a raised dome-shaped section which is essentially conical, with an envelope surface which forms a guiding surface as well as a support surface or bearing surface for the second engagement member 2. In order for the attachment apparatus to obtain a reasonable overall height, the angle of the conical surface is relatively small, although that angle can vary to a considerable extent, depending upon the particular mounting environment in question. At a circumferential guiding edge which runs around the engagement member and which is shown example as being circular, the conical guiding surface and support surface 3 transforms into the guiding surface and support surface 4, which in the example has the shape of a cylindrical jacket. Alternatively, the guiding surface and support surface 4 may have the shape of a conical jacket, which increases the guiding effect.

In order to lock the engagement members, 1 and 2, to each other, a locking device 6 is provided, which comprises a number of locking members, 7–10, which are arranged in the first engagement member 1 and which are adapted for cooperation with the locking members, 11–14, in the second engagement member 2, which will be described in greater detail below. In order to adjust the locking members, the engagement members, 1 and 2, are provided with an adjustment mechanism, 15 and 16, for adjustment between a disengagement position, in which the engagement members may be coupled together and separated from each other, respectively, and a locking position, in which the engagement members are locked to each other in a fixed relative position. The adjustment mechanism will be described in greater detail below.

Figure 5:
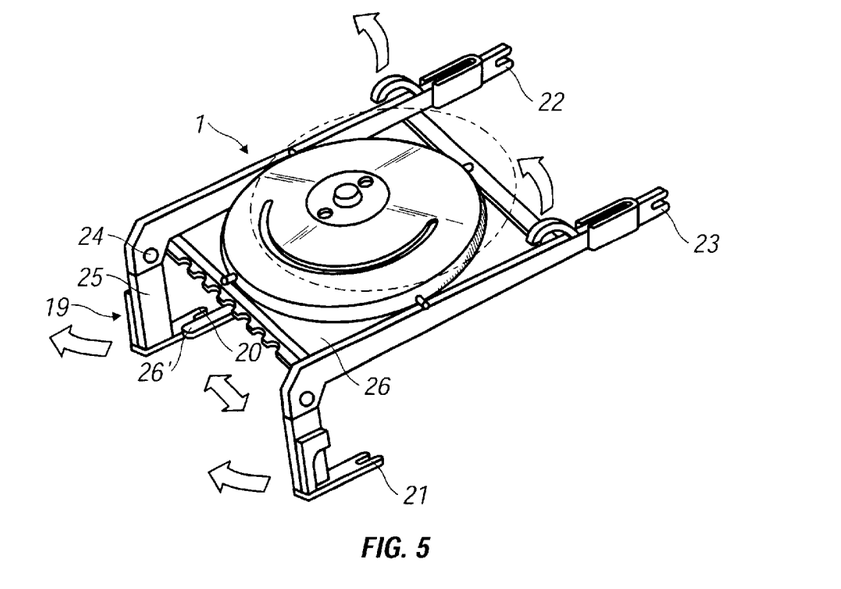
FIG. 5 is a top, perspective view of the first engagement member assembled with a fixture for attachment to a vehicle seat.
Figure 6:
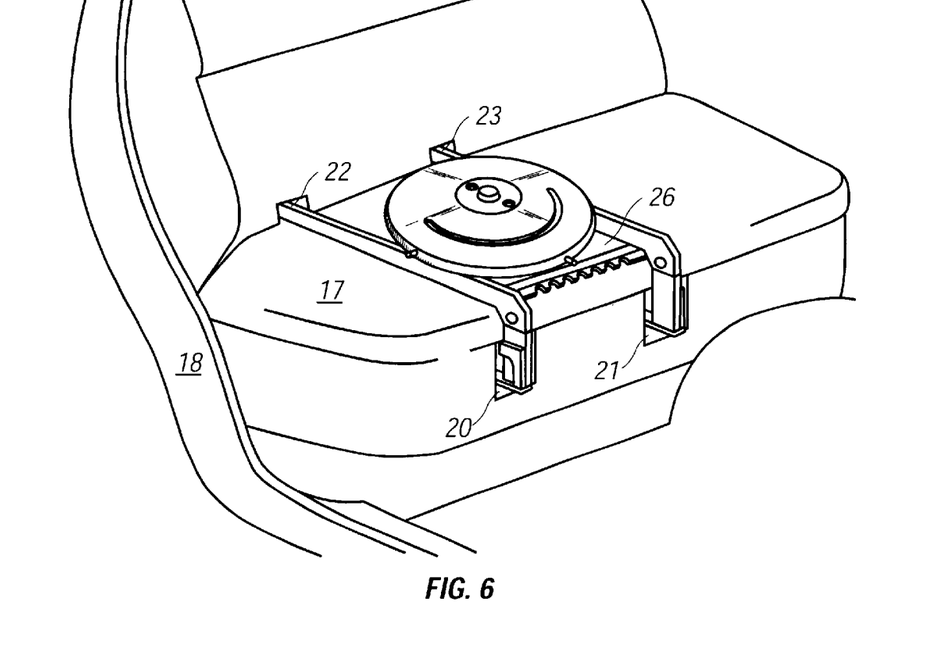
FIG. 6 is a front, perspective view of the corresponding engagement member when mounted on a vehicle seat.

FIGS. 5 and 6 show a preferred embodiment which is adapted to a system for attachment of, for example, a child's seat in a seat 17 in a motor vehicle, such as a passenger car 18. In this regard, the engagement member 1 is arranged on a frame 19 having four fixing points, 20, 21, 22, and 23, in the form of hook-like, self-locking elements, which are intended to be attached to corresponding fixing points in the vehicle seat. This arrangement, which constitutes a fixture having four fixing points, is suggested, as a standardized solution for several passenger car models, but in this case it serves as an adapter, by means of which the frame with four fixing points can be permanently mounted in the vehicle seat, whereas the two engagement members, 1 and 2, form the arrangement for releasable attachment of the child seat to the vehicle seat. The frame 19 may be designed in several different ways. For example, it may be provided with folding links 24 which are intended to fold the frame members 25, which are protruding downwards, into a storage position. The engagement member 1 may be attached to the frame in a number of different ways, but may, for example, be attached by means of a supporting plate 26 which extends between support members, and which supports the engagement member 1, or it may be attached by means of a number of cross bars. By means of a switch lever 26', the engagement member 1 is adjustable to different degrees of inclination in relation to the frame, which is shown in the example. In this manner, the inclination of the child seat may be individually adjusted to different inclinations of the seat.

Figure 7:
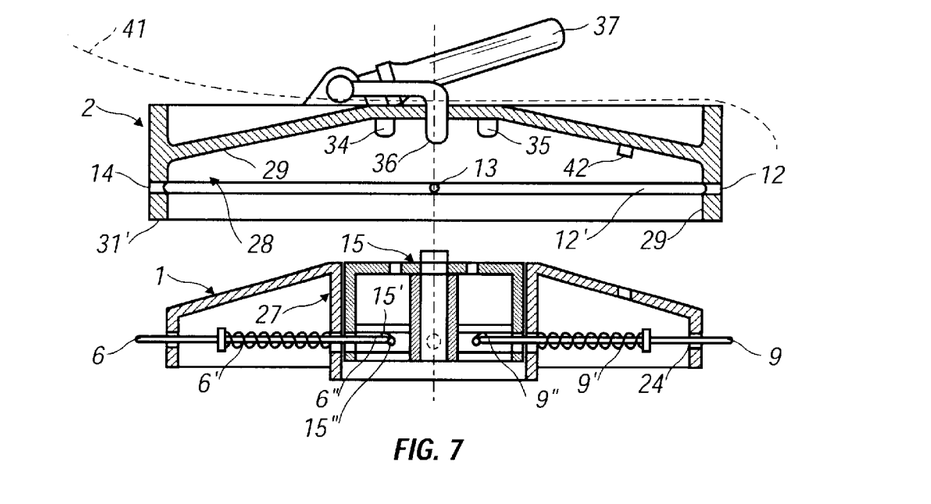
FIG. 7 is a side, elevational, cross-sectional view of the two engagement members shown in FIGS. 1 and 3 in a separated state.
Figure 8:
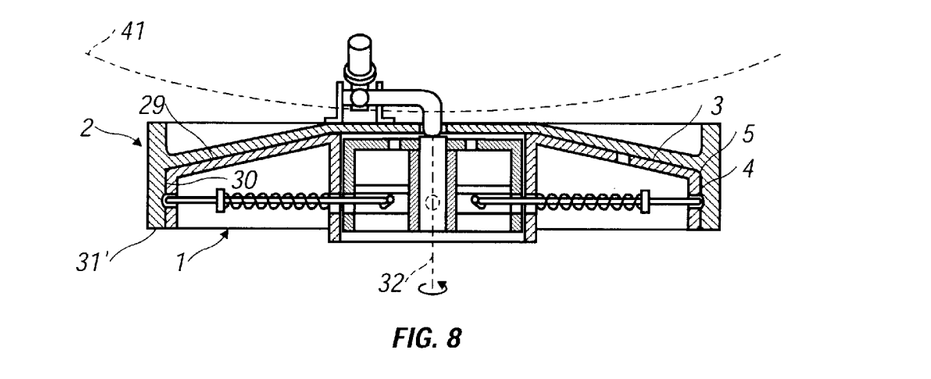
FIG. 8 is a side, elevational, cross-sectional view of the two engagement members shown in FIG. 7 in a first engagement position.
Figure 9:
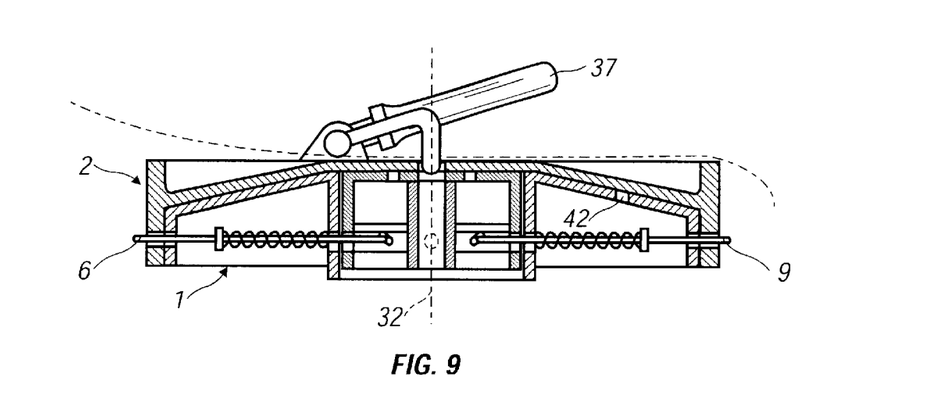
FIG. 9 is a side, elevational, cross-sectional view of the two engagement members shown in FIG. 7 in a final engagement position.

FIGS. 7, 8 and 9 illustrate a more detailed example of the construction of the locking device 6 and the adjustment mechanism, 15 and 16, the construction being intended for adjustment between a disengagement position and a locking position.

The above-mentioned locking members, 7–10, in the locking device 6 in the first engagement member 1, which in this example constitutes a lower engagement member, form sideways directed pins, which project essentially radially through openings 24, in both an unaffected initial position and also in a locking position, as will be described in detail below, pass through the cylindrical wall which forms the support surface 4 of the engagement member 1. In the example, the locking pins are four in number and are equally divided over the circumference of the engagement member, but both their number and placement can be varied to a considerable extent. The locking pins, 6 and 9, constitute external ends of locking bars, 6' and 9', which extend through holes, 6" and 9", in a stay tube 27, which projects downwards from the internal side of the engagement member 1. The guiding surfaces and support surfaces, 3 and 4, including the guiding edge 5, of the engagement member 1, are concentric around an axis of symmetry 32 for the engagement member 1.

As is most apparent from FIGS. 7, 8 and 9, the second engagement member 2 presents an internal form which is adjusted to the external, upwardly turned dome-shaped form of the first engagement member, the internal form having an internal cup-shaped space 28, which is adapted for engagement with the external form of the engagement member 1. Thus, the engagement member 2 presents corresponding guiding surfaces and support surfaces, 29 and 30, which extend concentrically around an axis of symmetry 32 for the engagement member 2. In the example, one of the guiding surfaces and support surfaces 29 comprises a similarly conical envelope surface, although it is sufficient that the engagement member 2 presents support surfaces which extend annularly, or supporting heads which are situated at suitable locations and at suitable heights, by means of which the engagement member 2 obtains a rigid support against the lower engagement member while these members are coupled together. The support surface 30, however, is preferably uniform with the support surface 4 in the lower engagement member, which results in a dimensional deviation which provides a suitable tolerance.

The support surface 30 is formed by a wall 31 having the shape of a cylindrical jacket. The lower parts of the support surface 30 and the wall 31 are terminated by an edge 31' which runs around the engagement member and which, in the example, is circular and in practice forms a guiding edge for cooperation with the guiding surface 4 and the guiding edge on the lower engagement member 1, which will be described in greater detail below. The wall 31 presents locking members, 11–14, in the form of through holes, the number and the locations of which are suitably adjusted to the number and the locations of the locking pins, 6–9. It is, however possible to arrange a larger number of holes, provided that locking positions in several alternative torsional positions of the upper engagement member 2 in relation to the lower engagement member 1 is desired. As is apparent from rigs, 3 and 7, the support surface presents a groove 121 which runs around the engagement member and between the holes, 12, 13 and 14, the groove being adapted for accommodating the locking pins, 6 and 9, in positions between the holes, which will be described in greater detail below.

The above-mentioned adjustment members, 15 and 16, are adapted for cooperation with the locking members 6 in such a way that it is possible to readjust the adjustment members between a disengagement position and an engagement position. In the example, the adjustment member 15 in the lower engagement member 1 comprises a centrally, essentially cylindrical, depressible section, which is at least linearly movable in the longitudinal direction of the symmetry axis 32. The depressible section 15 presents a pressure plate 33 which is adapted for cooperation with code members, 34 and 35, which project downwards and slightly eccentrically from the interior of the upper engagement member 2. In order to disengage the locking device, a centrally located adjustment member 36 is provided, which may be raised or lowered by means of a control handle 37, which, as is best seen from FIG. 4, is arranged such that it is easily accessible from the exterior of the upper engagement member 2 and which is rotatably arranged in the upper engagement member around a link 38.

According to the present invention, the adjustment member 15 on the lower engagement member is arranged such that its movement between an initial position according to FIG. 7 and a depressed position according to FIG. 8 results in an adjustment movement of the locking members, 6–9, in the lower engagement member. This adjustment can be accomplished in several different ways, and in the example which is shown in FIGS. 7–9, it has been solved by means of oblique slits 15, in wall sections in the adjustment member. Transversal pins 15" project into the slits 15', the transversal pins being fixedly attached to the internal ends of the locking bars, 6' and 9'. In this manner, movement of the depressible section 15 is transformed in the direction of the axle 32 into radial adjustment of the locking members, 6 and 9.

Figure 10:
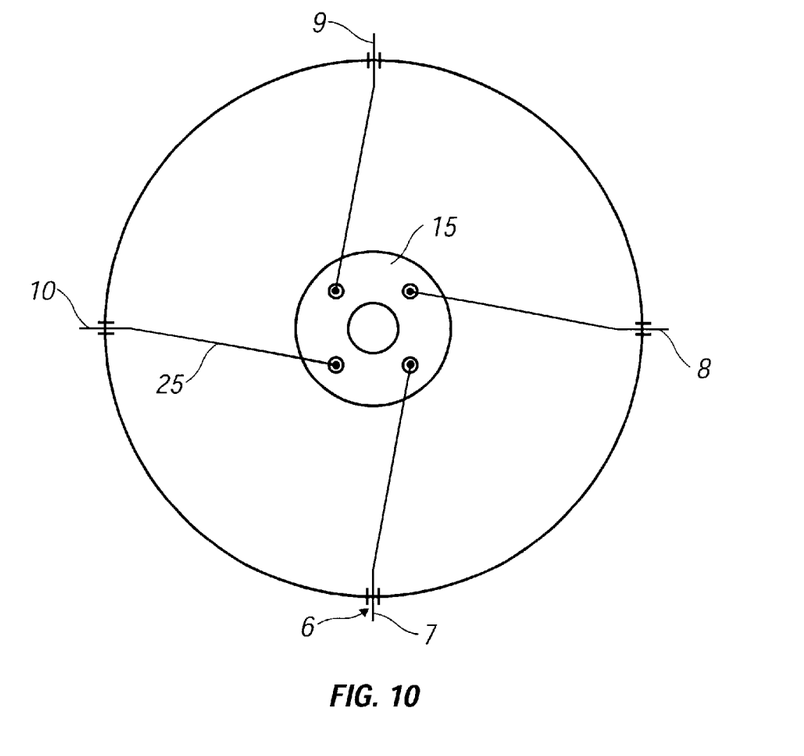
FIG. 10 is a top, elevational, schematic view of an adjustment mechanism forming part of the first engagement member of the present invention.
Figure 11:
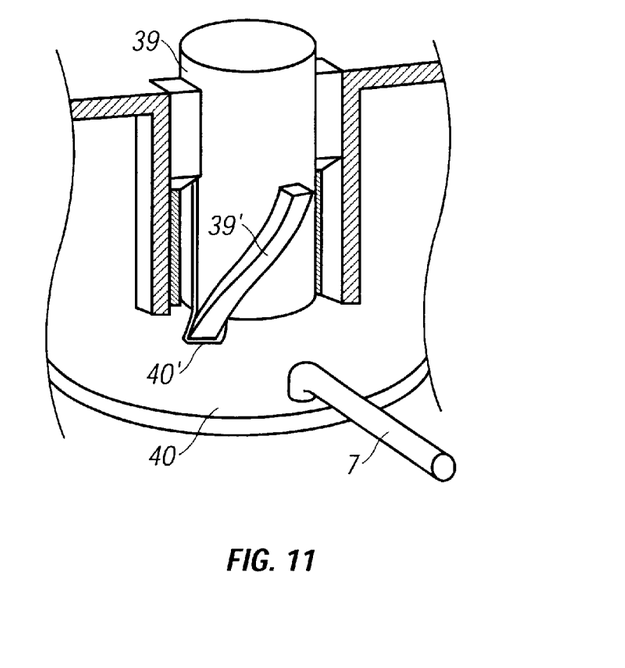
FIG. 11 is a side, perspective, schematic, partial view of an adjustment mechanism forming part of the first engagement member of the present invention.

FIGS. 10 and 11 schematically show an additional example of a mechanism for transmission of the movement between the adjustment member 15 and the locking members, 6–9. In this example, the locking bars 25 are not entirely radially directed, but are fixed eccentrically in the adjustment member 15, which consists of a push button 39 which cannot be turned but which is axially movable along the symmetry axis 32, and a rotary disc 40 which can be turned around the symmetry axis. This rotary motion is accomplished by means of spiral cams 39' on the push button, the spiral cams extending through recesses 40' In the rotary disc 40. In this regard, the code members, 34 and 35, of the upper engagement member are intended to depress the push button, which creates the rotary motion of the rotary disc by means of its axial movement, and thus also longitudinal displacement motion of the locking bars which are fixed in the rotary disc, which thereby creates the adjustment movement of the locking bars, 6–9.

Apart from the above-described basic mechanisms of the locking members and the adjustment members and the code members, 34 and 35, the engagement members in the example are provided with additional code members, 41' and 42' (see FIG. 1). In the example, these additional code members are arranged as an arc-shaped groove 41 in the lower engagement member which is adapted for cooperation with a pilot 42, which is intended to project downwards into the groove from the interior of the upper engagement member. The arc-shaped groove has a limited angular extension, for example 180°. This provides a relative pivoting movement between the two engagement members over a limited angular interval, which, for example, makes it possible for a child seat to be situated crossways a longitudinal direction of a vehicle, followed by a rotary motion, for example, by 90°, to an engagement position.

With reference to, in the first place, FIGS. 7, 8 and 9, the attachment apparatus, and the manner in which it is used, for example, to attach a child's seat to a car seat, and the manner in which the child's seat is released, shall now be described in a comprehensive manner. In this regard, FIG. 7 shows entirely schematically the contour of a lower section of a child's seat 41, on the underside of which the upper engagement member 2 is mounted. When the child seat and the upper engagement member 2 are completely separated from the lower engagement member 1, the adjustment member 15 in the lower engagement member is located in an initial position, i. e. it is not depressed. This position is maintained by means of springs, for example pressure springs, which keep the locking members 6 in an outwardly projecting position, i.e. a locking position, which also keeps the adjustment member 15 in its upper, nondepressed, position.

FIG. 8 shows the two engagement members, 1 and 2, in a connected position, in which the child's seat is adjusted from the side in such a way that the upper engagement member 2 has been brought down on and centered upon the lower engagement member. By means of cooperation between, on the one hand, the guiding surfaces, 3 and 4, and the guiding edge in the upper engagement member and, on the other hand, the guiding surfaces, 29 and 30, and the edge 31, in the upper engagement member, the two engagement members are forced into a rigid support position which is centered around the central axle 32. In this manner, the downwardly projecting code members, 34 and 35, in the upper engagement member will press against the pressure area 42 of the adjustment member 15 and thereby press said adjustment member down by means of which the locking pins, 6–9, are kept in a withdrawn position. In this regard, the locking members, 6–9, are not entirely recessed in the lower engagement member 1 and are also most likely not situated right in front of the holes, 11–14, but project into the guiding groove 12, which runs around the engagement member. This provides a temporary locking position, in which position the upper engagement member 2 can be rotated without a risk of the arrangement turning over. After that, the child's seat 41 is rotated approximately a quarter of a turn while the locking members 10 run in the guiding groove 12', whereupon the eccentrically situated adjustment pins, 34 and 35, are allowed to project downwardly in the corresponding recesses, 43 and 44, when the rotary motion has resulted in the recesses being situated in front of the pins. In this manner, the depressing action against the pressure area 33 ceases and the adjustment member 15 springs back towards its initial position (see FIG. 9). By means of the fact that the slits 15' are cooperating with the locking members 6, which in this regard are situated in front of the corresponding openings, 11–14, in the upper engagement member, the locking pins are brought to a locking position, which is due to the fact that the locking pins are inserted into the corresponding openings. In this manner, the locking pins, 6–9, are synchronized to such extent that all of the locking pins are brought along in this movement.

The fact that a complete locking position has been secured is with advantage indicated by means of the fact that the external ends of the locking pins, 6–9, are marked with a clearly visible color marking, the ends protrude to such an extent that they are easily observed by a user. In order to avoid the ends of the locking members from hitching onto any edge areas, the ends are slightly rounded off. Thus, if a locking pin jams or in any other way is obstructed, the locking pin will not be adjusted to a locking position.

When the two engagement members are coupled together, the attachment apparatus can be completely load carrying, wherein the arrangement manages very large retarding forces in the locking position, which provides for a high degree of safety in the event of a traffic accident.

In order to disengage the attachment apparatus, the control handle 37 is depressed into the adjustment member 16, and the movable adjustment pin 36 is thus forced to depress the adjustment member 15 by means of a section, which in the example is raised. This results in the locking members, 6–9, being recessed from the locking position to the disengagement position, wherein the child seat can be raised and removed. The above-mentioned groove 121, which runs circularly between the holes, 11–14, provides for guiding of the locking taps both during disengagement and while the upper engagement member 2 is rotated, by means of which there is no risk of the child's seat turning over during the rotary motion of approximately a quarter of a turn, which makes it easier to lift the seat through a door opening. Thus, the disengagement is executed in two steps, which can be adjusted by means of the control handle 37, which can be provided with two defined positions by means of, for example, a retaining mechanism.

The above-described attachment apparatus can have several different applications. For example, objects other than child seats may be attached, such as a safe-deposit box in, for example, a luggage boot, an animal cage, etc. The attachment apparatus may also be used for mobile units other than cars, such as, for example, for attachment of a child's seat or a perambulator inset to a perambulator frame. By means of the attachment apparatus, a child's seat may also be attached to a bicycle, etc. Furthermore, the attachment apparatus may have a construction other than the above-described construction. The example shows an entirely rotary symmetrical embodiment, but it is also possible to replace the conical surface with planar surfaces, such as, for example, a polygonal pyramid, by means of which the rotational position will be defined in a secure way.

Inversely, the cup-shaped engagement member 2 can be arranged in the frame, while the dome-shaped engagement member 1 can be turned downwards and be arranged in the releasable member.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the releasable attachment of an object to a movable unit, said apparatus comprising:

a first engagement member having a first guiding support surface adapted to be fixed to said movable unit, and a second engagement member having a second guiding support surface adapted to cooperate with said first guiding support surface and to be fixed to said object, whereby, when engaged with each others said first and second engagement members are adapted to be centered about a common axis of symmetry, one of said first and second guiding support surfaces comprising an outer surface of one of said first and second engagement members and said other of said first and second guiding support surfaces comprising an inner surface of the other of said first and second engagement members, said first engagement member including a plurality of first locking members and said second engagement member including a plurality of second locking members for cooperating with said plurality of said first locking members, whereby said first and second engagement members can be adjusted between a first relative position in which said plurality of first locking members and said plurality of said second locking members are disengaged, and a second relative position in which said plurality of first locking members and said plurality of second locking members are lockingly engaged, and a first adjustment member affixed to one of said first and second engagement members and second adjustment member affixed to the other of said first and second engagement members for adjusting said plurality of first locking members and said plurality of second locking members between said first and second relative positions.

2. The apparatus of claim 1 wherein said one of said first and second guiding support surfaces defines a dome-shaped surface and said other of said first and second guiding support surfaces defines a cup-shaped surface.

3. The apparatus of claim 1 wherein said one of said first and second guiding support surfaces comprises a first surface provided at an angle with respect to said axis of symmetry and a second surface provided substantially parallel to said axis of symmetry.

4. The apparatus of claim 3 wherein said first surface has the shape of a conical jacket.

5. The apparatus of claim 3 wherein said second surface has the shape of a cylindrical jacket.

6. The apparatus of claim 3 wherein said plurality of first locking members comprises a plurality of locking pins substantially radially projecting with respect to said axis of symmetry for engagement with said plurality of second locking members when said first and second engagement members are in said second relative position.

7. The apparatus of claim 6 wherein said plurality of second locking members comprises a plurality of recesses corresponding to said plurality of locking pins.

8. The apparatus of claim 1 wherein said first adjustment member comprises an axially movable member movable between an initial position and a depressed position, whereby said axially movable member can be in said depressed position when said first and second engagement members are in said first relative position and in said initial position when said first and second engagement members are in said second relative position.

9. The apparatus of claim 8 wherein said first adjustment member is associated with said first engagement member and said second adjustment member is associated with said second engagement member, said first engagement member including apertures means and said second engagement member including corresponding projection means, whereby when said first and second engagement members are engaged with each other and said projection means are not engaged in said aperture means, said projection means urges said axially movable member into said depressed position, and when said projection means are engaged in said aperture means said axially movable member is in said initial position.

10. The apparatus of claim 9 wherein said plurality of first locking members are connected to said axially movable member whereby when said plurality of first locking members are disengaged from said plurality of second locking members said axially movable member is in said depressed position and when said plurality of first locking members are engaged with said plurality of second locking members said axially movable member is in said initial position.

11. The apparatus of claim 9 wherein said second adjustment member includes a control handle, said control handle being engageable with said axially movable member whereby when said control handle is actuated to depress said axially movable member said plurality of first locking members is disengaged from said plurality of second locking members.

12. Apparatus for the releasable attachment of a child's seat to a motor vehicle, said apparatus comprising:

a first engagement member having a first guiding support surface adapted to be affixed to said motor vehicle and a second engagement member having a second guiding support surface adapted to cooperate with said first guiding support surface and to be fixed to said child seat, whereby, when engaged with each other, said first and second engagement members are adapted to be centered about a common axis of symmetry, one of said first and second guiding support surfaces comprising an outer surface of one of said first and second engagement members and said other of said first and second guiding support surfaces comprise an inner surface of the other of said first and second engagement members, said first engagement member including a plurality of first locking members and said second engagement member including a plurality of second locking members for cooperation with said plurality of first locking members, whereby said first and second engagement members can be adjusted between a first relative position in which said plurality of first locking members and said plurality of second locking members are disengaged and a second relative position in which said plurality of first locking members and said plurality of second locking members are lockingly engaged, a first adjustment member affixed to one of said first and second engagement members and a second adjustment member affixed to the other of said first and second engagement members for adjusting said plurality of first locking members and said plurality of second locking members between said first and second relative positions.

13. The apparatus of claim 12 wherein said other of said first and second engagement members includes a guiding groove along said inner surface, said guiding groove adapted for guiding said plurality of first locking members thereaolong whereby said first and second engagement members may be coupled together and rotated with respect to each other.

\* \* \* \* \*